Oct. 18, 1955 C. W. HINES 2,720,694

METHOD FOR ERECTING ELEVATED STRUCTURES

Filed June 16, 1949 13 Sheets-Sheet 1

Inventor:
Clarence W. Hines,
By Schroeder, Merriam,
Hofgren & Brady, Attys.

METHOD FOR ERECTING ELEVATED STRUCTURES

Filed June 16, 1949

Inventor:
Clarence W. Hines,
By Schroeder, Merriam,
Hofgren & Brady, Att'ys.

METHOD FOR ERECTING ELEVATED STRUCTURES

Filed June 16, 1949 13 Sheets-Sheet 3

Inventor:
Clarence W. Hines,
By Schroeder, Merriam,
Hofgren & Brady, Attys.

METHOD FOR ERECTING ELEVATED STRUCTURES

Filed June 16, 1949 13 Sheets-Sheet 4

Inventor:
Clarence W. Hines,
By Schroeder, Merriam,
Hofgren & Brady, Attys.

METHOD FOR ERECTING ELEVATED STRUCTURES

Filed June 16, 1949

Inventor:
Clarence W. Hines,
By Schroeder, Merriam,
Hofgren & Brady, Attys.

METHOD FOR ERECTING ELEVATED STRUCTURES

Filed June 16, 1949

Inventor:
Clarence W. Hines,
By Schroeder, Merriam,
Hofgren & Brady, Attys.

METHOD FOR ERECTING ELEVATED STRUCTURES

Filed June 16, 1949 13 Sheets-Sheet 7

Inventor:
Clarence W. Hines,
By Schroeder, Merriam,
Hofgren & Brady Attys.

METHOD FOR ERECTING ELEVATED STRUCTURES

Filed June 16, 1949 13 Sheets-Sheet 8

Inventor:
Clarence W. Hines,
By Schroeder, Merriam,
Hofgren & Brady, Attys.

Oct. 18, 1955 C. W. HINES 2,720,694

METHOD FOR ERECTING ELEVATED STRUCTURES

Filed June 16, 1949 13 Sheets-Sheet 9

Inventor:
Clarence W. Hines,
By Schroeder, Merriam,
Hofgren & Brady, Attys.

Oct. 18, 1955 C. W. HINES 2,720,694

METHOD FOR ERECTING ELEVATED STRUCTURES

Filed June 16, 1949 13 Sheets-Sheet 10

Inventor:
Clarence W. Hines,
By Schroeder, Merriam, Hofgren & Brady, Attys.

Inventor:
Clarence W. Hines,
By Schroeder, Merriam,
Hofgren & Brady, Attys.

Oct. 18, 1955 C. W. HINES 2,720,694

METHOD FOR ERECTING ELEVATED STRUCTURES

Filed June 16, 1949 13 Sheets-Sheet 12

Inventor:
Clarence W. Hines,
By Schroeder, Merriam,
Hofgren & Brady, Attys.

Inventor:
Clarence W. Hines,
By Schroeder, Merriam,
Hofgren & Brady, Attys.

United States Patent Office 2,720,694

Patented Oct. 18, 1955

2,720,694

METHOD FOR ERECTING ELEVATED STRUCTURES

Clarence W. Hines, Chicago, Ill., assignor to Chicago Bridge & Iron Company, a corporation of Illinois Application June 16, 1949, Serial No. 99,507

6 Claims. (Cl. 29—467)

This invention relates to methods for the erection of elevated structures and more particularly to methods for the erection of elevated storage tanks.

The methods are particularly adaptable for use in the erection of column supported elevated tanks. The tank may be of the watersphere type in which a substantially spherical tank is supported upon a single tubular column, or it may be the common type of tank which is supported by a plurality of columns.

The usual method of erecting tanks of the type described employs the use of a guyed gin pole for the erection of the tubular column and either a guyed gin pole or a guyed derrick for the erection of the tank itself. In such methods, one or more guy lines extend laterally from the top of the gin pole or derrick to points at some distance from the structure at which points they are anchored into the ground, tied to large trees, or secured to some other substantial anchorage.

Guy lines are an objectionable adjunct to erection equipment for the following reasons. The points of anchorage are often difficult to establish because they must be located at a considerable distance from the tank itself and most often on property owned by others. Anchorage for elevated tanks require holes in the ground of substantial proportions and when a water tank is to be located in a residential district the necessity of spotting such an anchor in a private owner's lawn or garden creates problems. There are also objections to having guy lines passing over house tops and through the branches of valuable trees. In congested areas where buildings, streets, sidewalks and driveways solidly occupy the space desired for guy line anchors, the problem is especially difficult. A body of water or a river adjacent one or more sides of the tank precludes the use of guy lines in that direction and special very expensive methods must be used instead. Soft and swampy grounds likewise present problems of obtaining secure anchorage. The proximity of high tension electric power lines creates additional hazards in handling the guy lines over and under such lines. Electrocutions through the accidental contact of a guy line and an electric line are constantly to be feared and it becomes necessary to shut off the power during critical moments when guy lines are being moved.

In using the ordinary methods for erecting a tank the gin pole or derrick must be "jumped" upward to succeeding points of elevation as the work progresses. Jumping requires careful manipulation of the guy lines to keep the top end of the pole or derrick securely balanced and at the same time pay out on each guy just enough to keep pace with the hoisting of the derrick itself. This is a critical operation which requires skill and great care.

Occasionally, for the erection of small storage tanks to be supported on three or more columns, a basket pole may be used. This device requires no guy lines outside of the structure itself. The basket pole is a single gin pole type member used in the center of the structure with the bottom end supported in a pendant which hangs from the panel points of the tower and the top end is supported by adjustable guy lines whose lower ends are secured to the same panel points. This method is limited to the construction of comparatively small tanks having a capacity of less than 300,000 gallons and obviously cannot be used for the erection of larger structures.

I have invented and am herein disclosing and claiming a method to be used in the construction of elevated structures such as storage tanks of any size. My method does not require guy lines which extend beyond the structure itself. By the use of my method it is now possible to erect elevated tanks on any site large enough for the structure itself and without interfering with or utilizing adjacent areas during the construction.

The method and apparatus will be described in conjunction with the accompanying drawings, in which.

Figure 17:
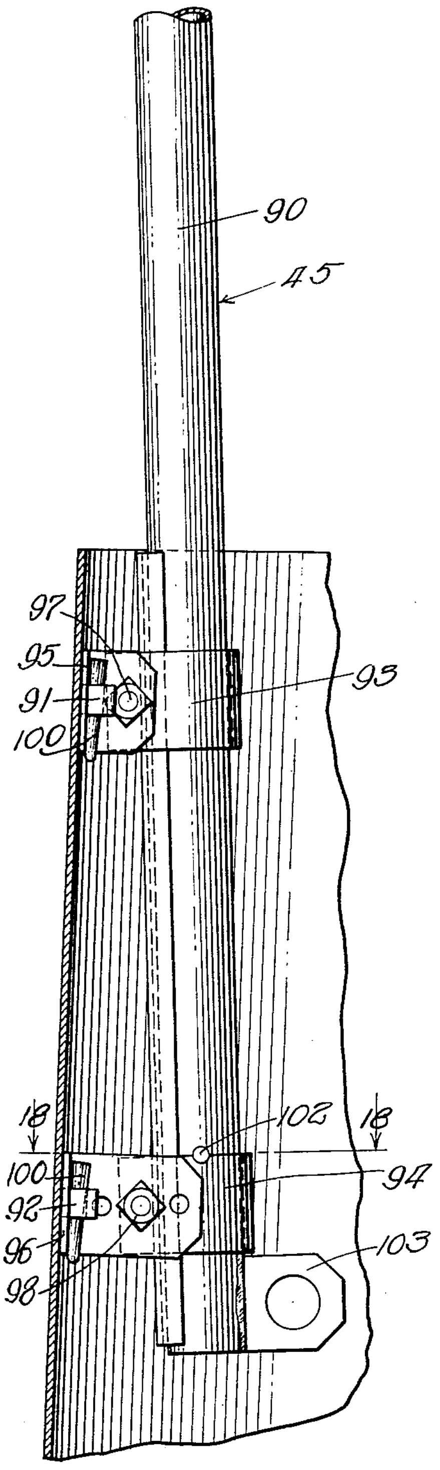
Figure 18:
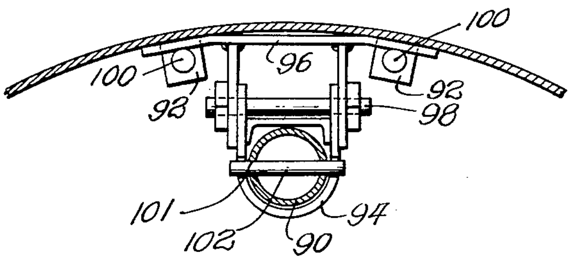
Figure 19:
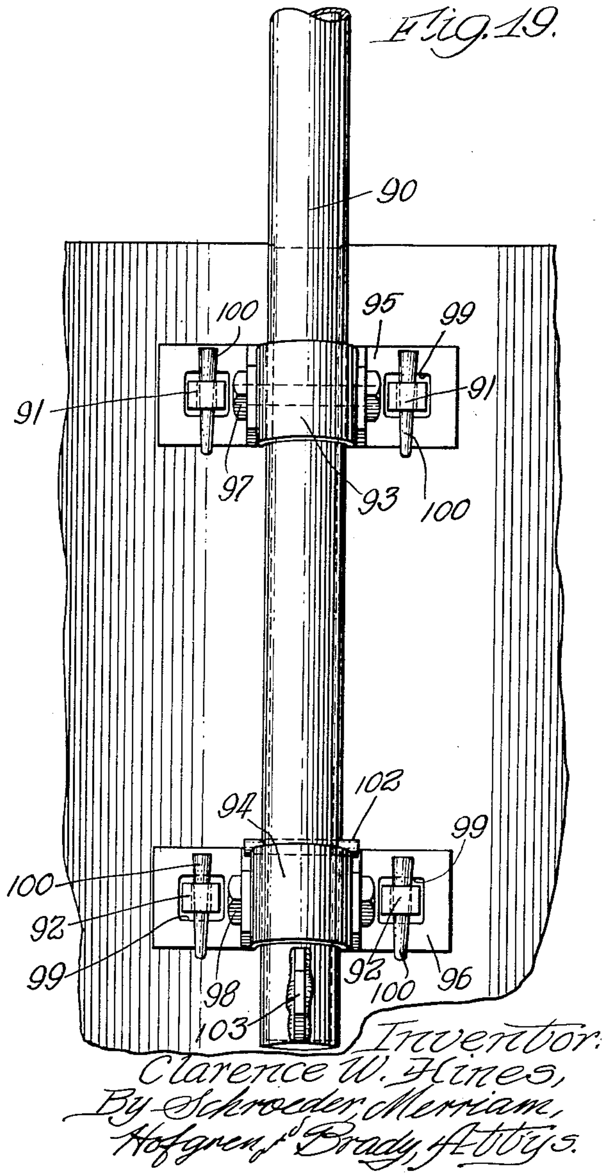
Figures 20, 21:
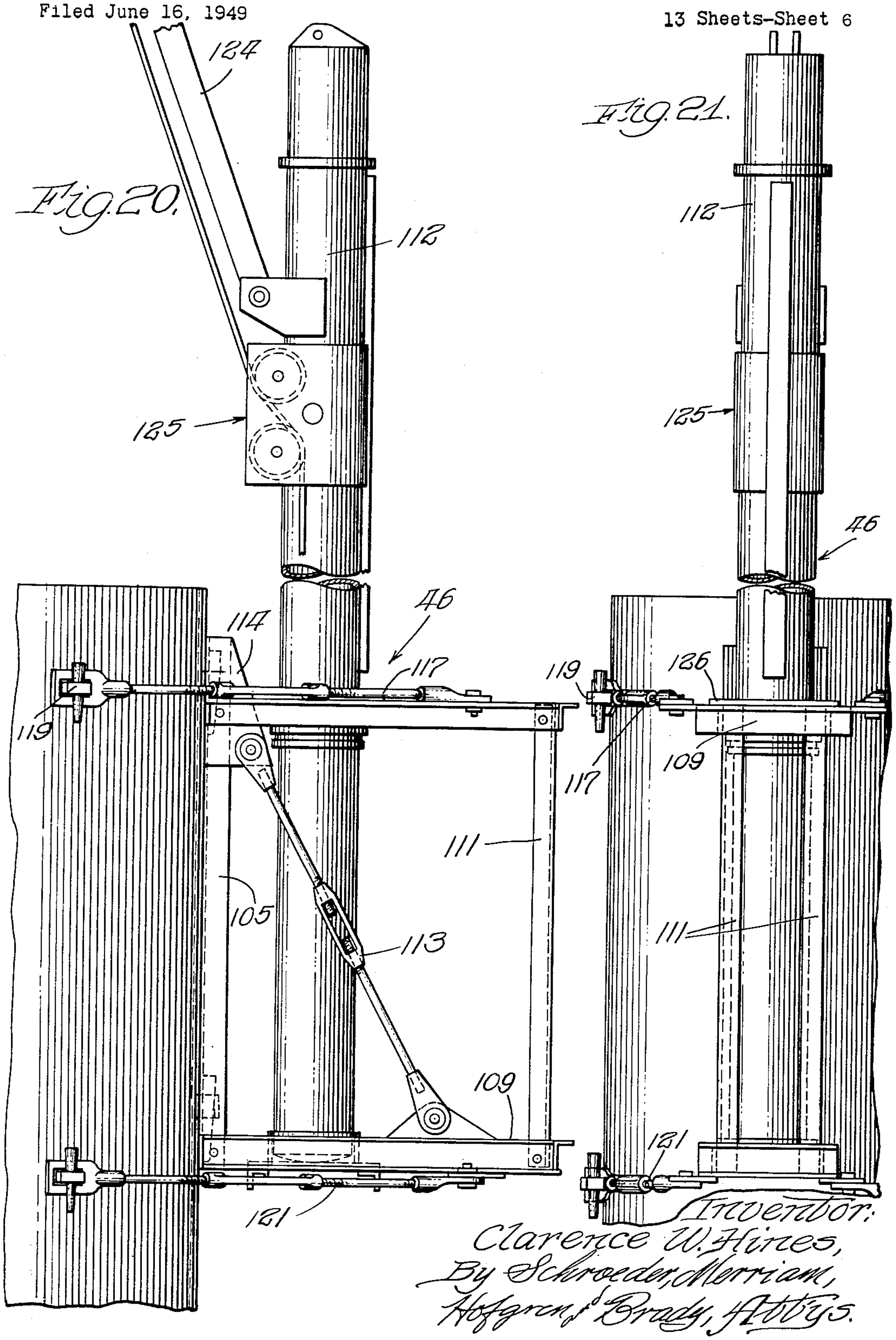
Figures 22, 23, 24, 25:
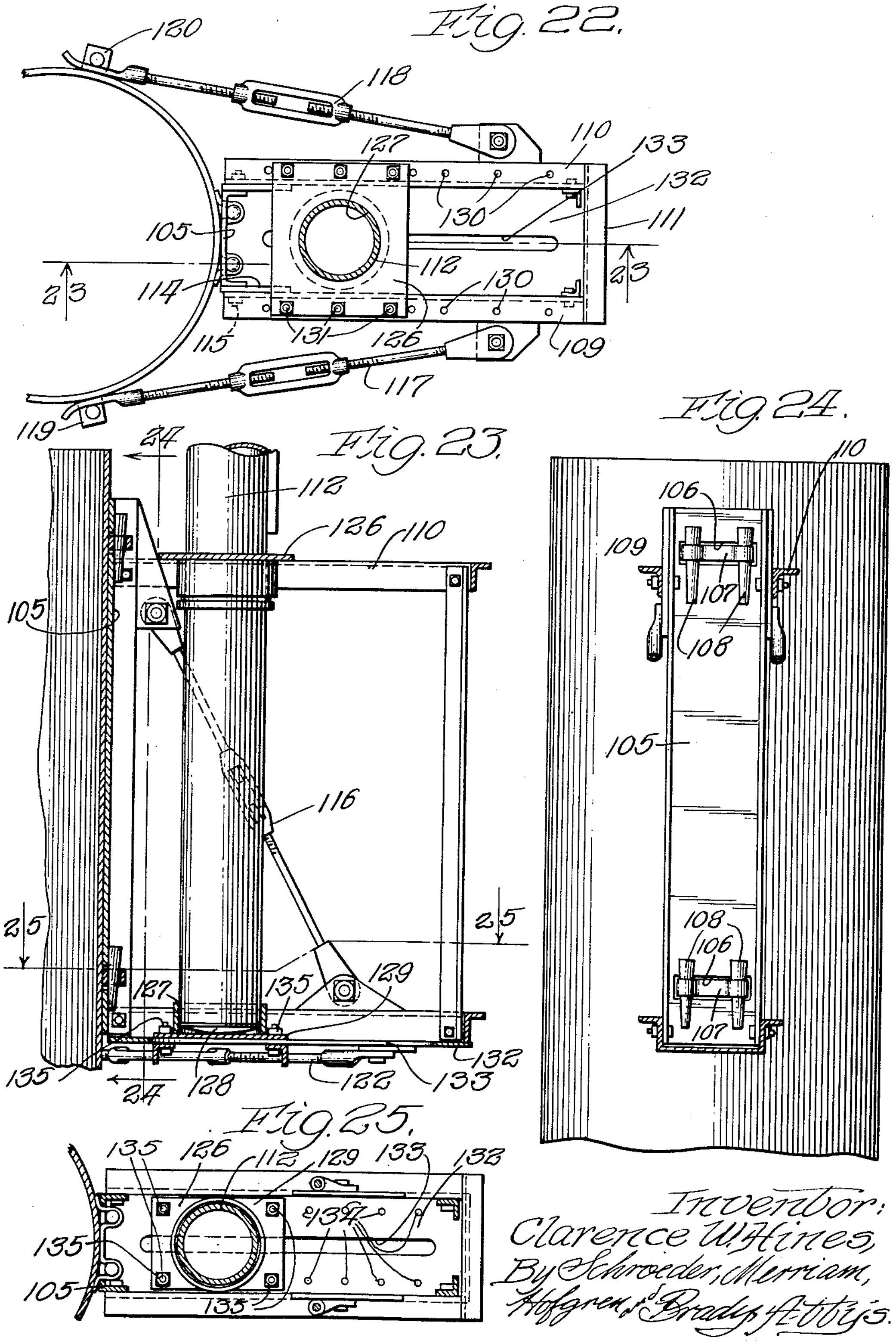

Figs. 6 to 16, inclusive, are elevational views showing the steps of process in the erection of a watersphere;

Fig. 17 is an enlarged detailed view of a portion of a column with a type of hoisting device secured thereto;

Fig. 18 is a horizontal section along line 18—18 of Fig. 17;

Fig. 19 is a view like Fig. 17 taken from a position 90° therefrom;

Fig. 20 is a side elevation of a portion of a second type of hoisting device used in the process and Fig. 21 is a view like Fig. 20 taken from a position 90° therefrom;

Fig. 22 is a top plan view, partly in section, of the device shown in Fig. 20.

Figure 26:
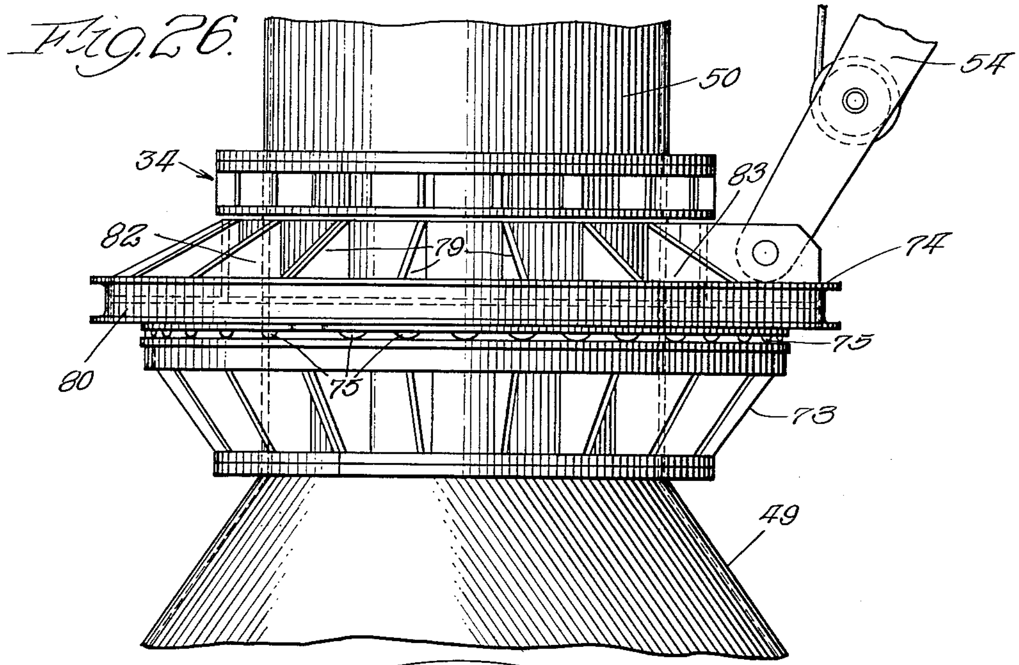
Figure 27:
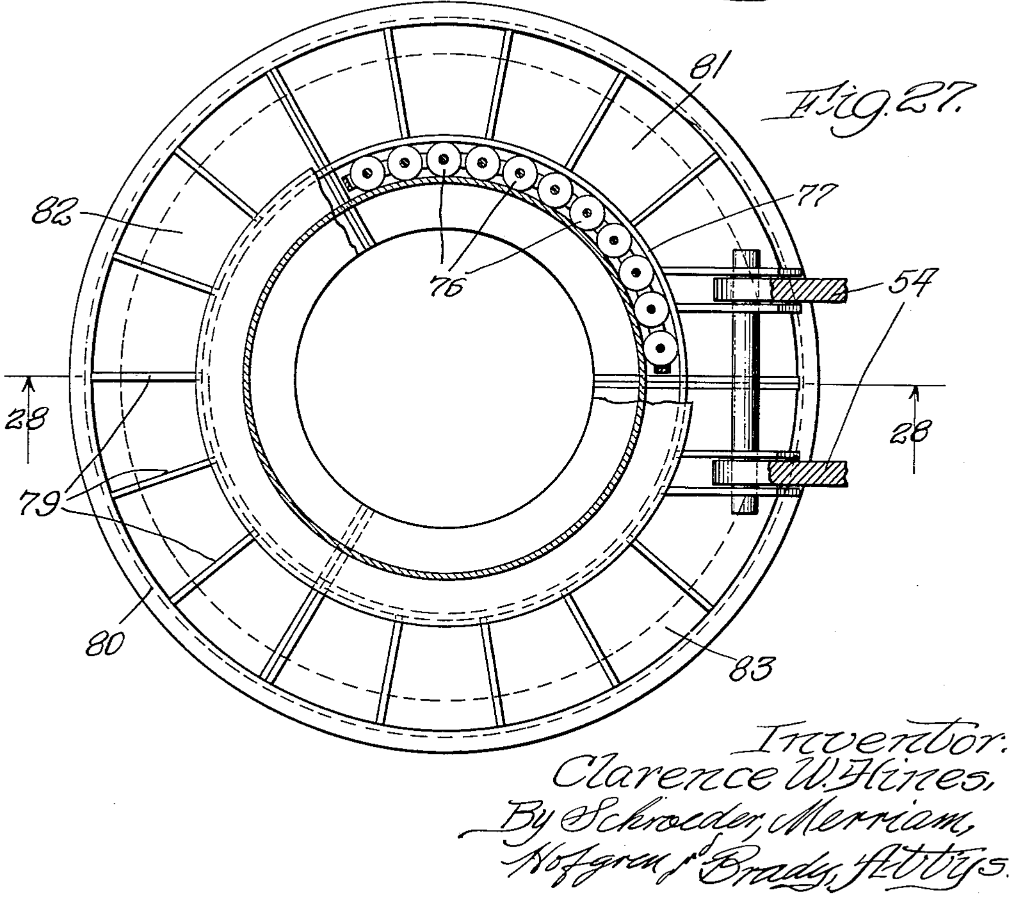
Figure 28:
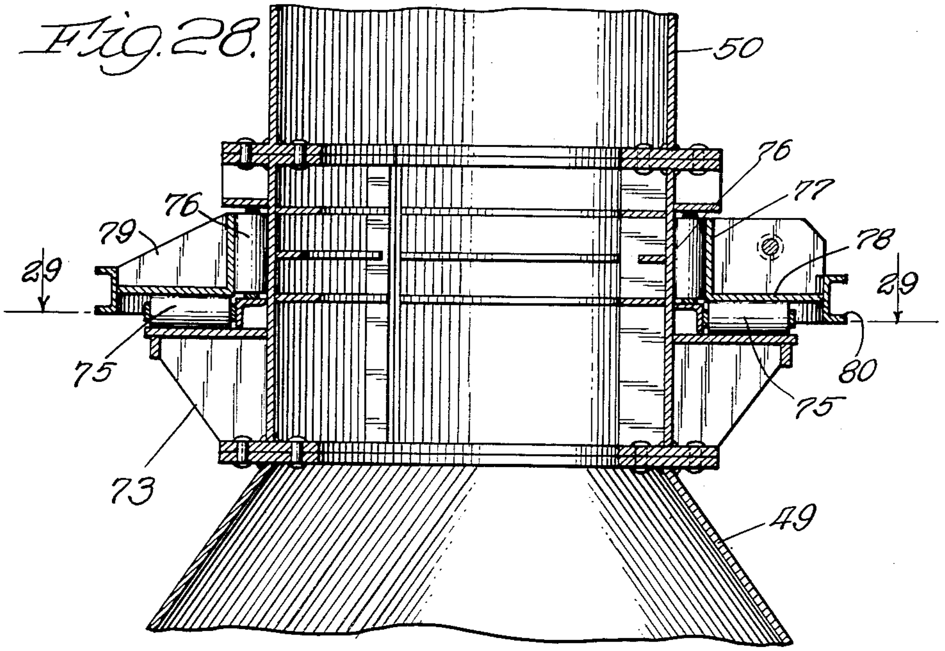
Figure 29:
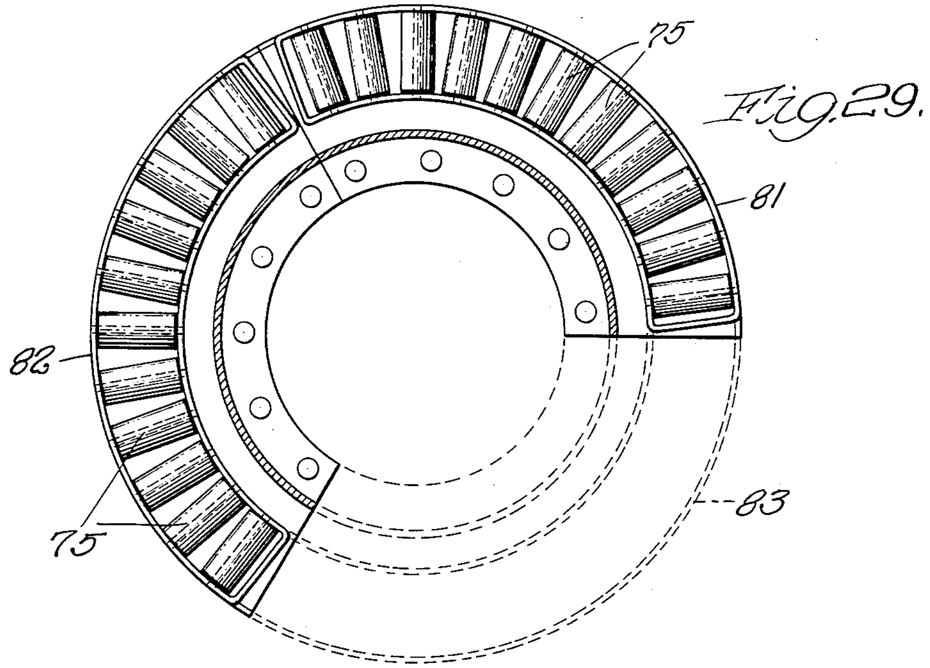
Figures 30, 31, 32, 33:
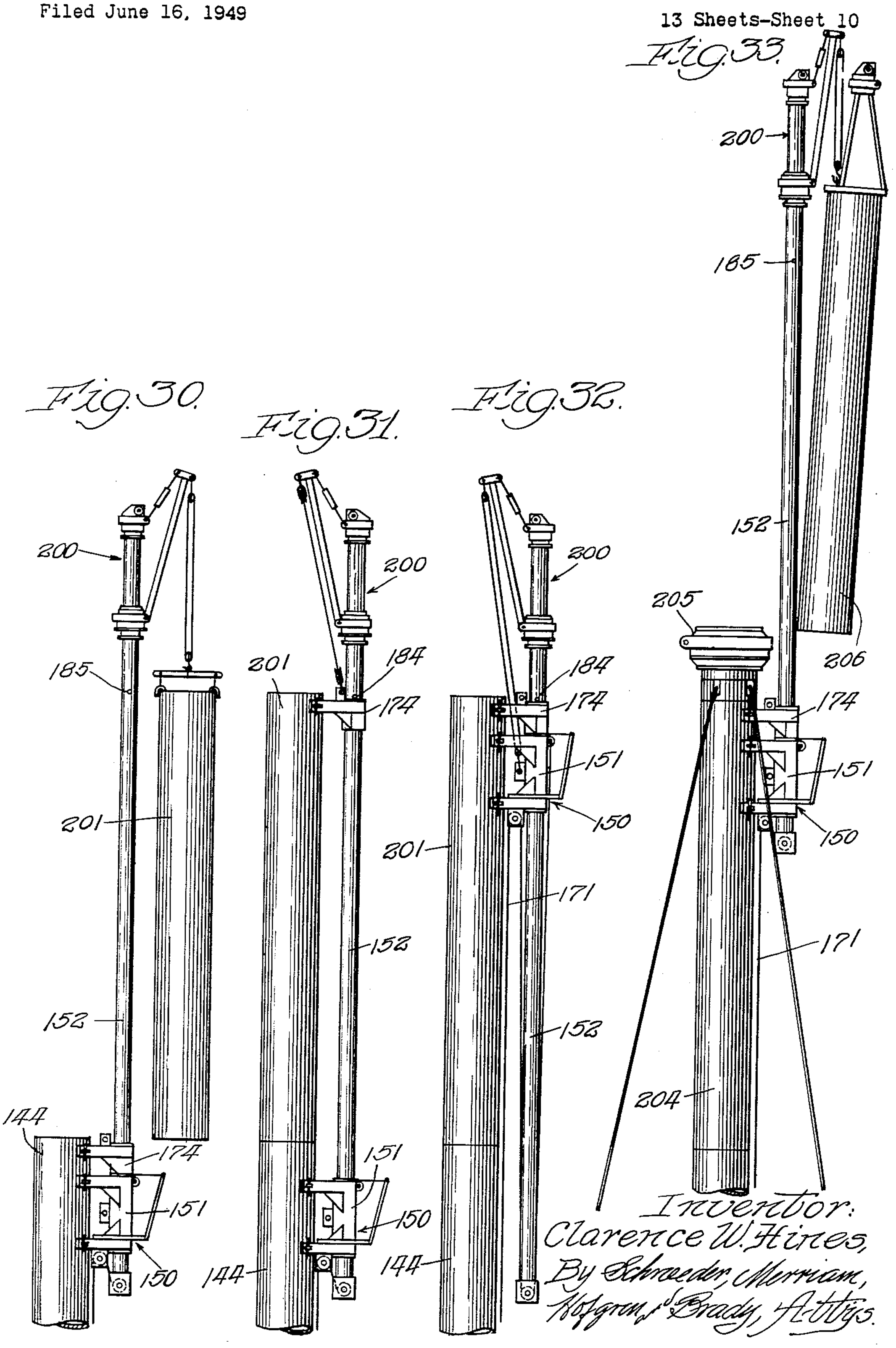
Figure 34:
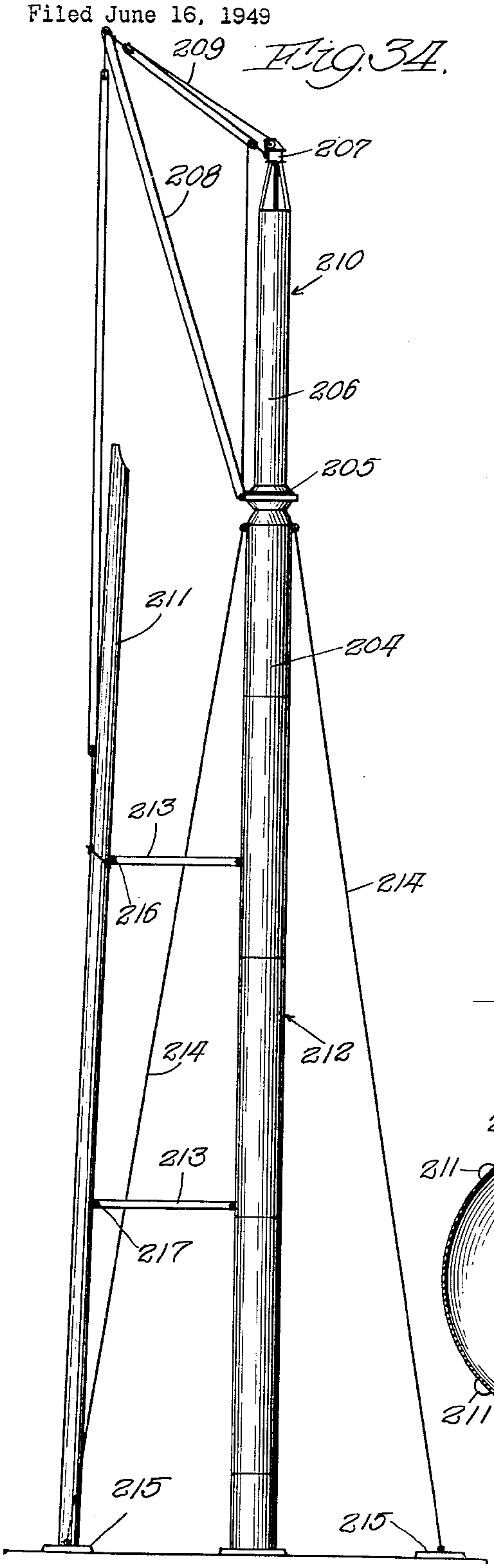
Figure 35:
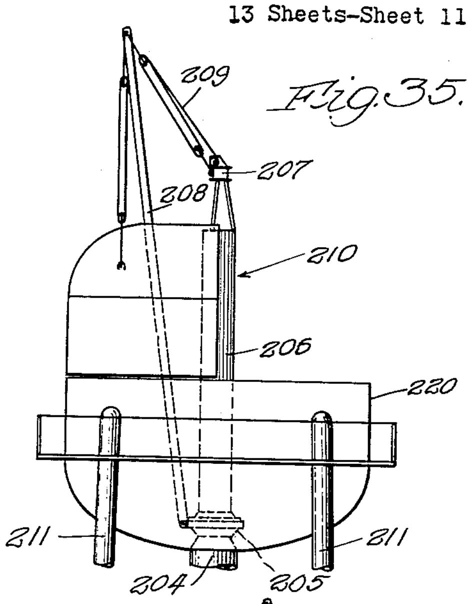
Figures 36, 37:
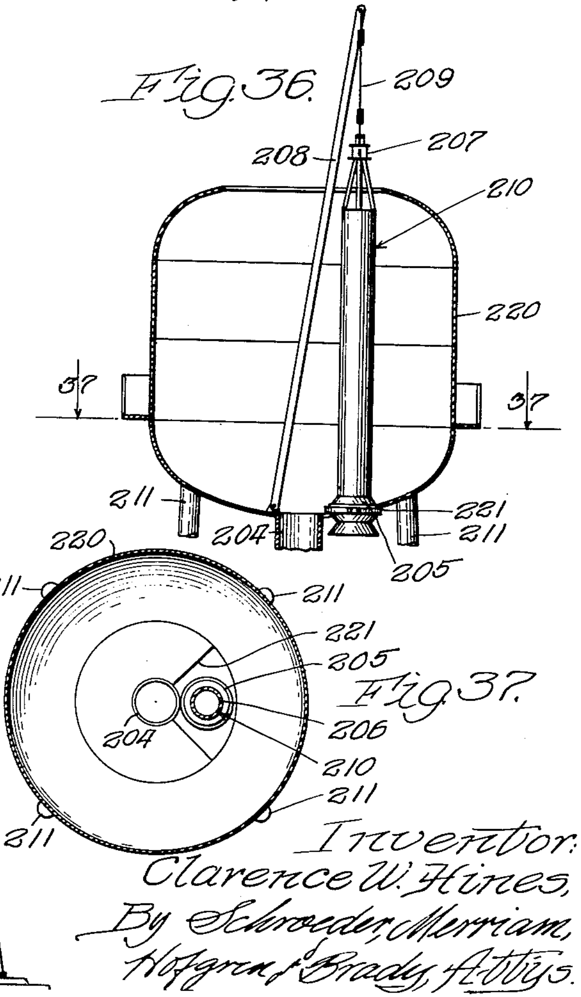
Figure 38:
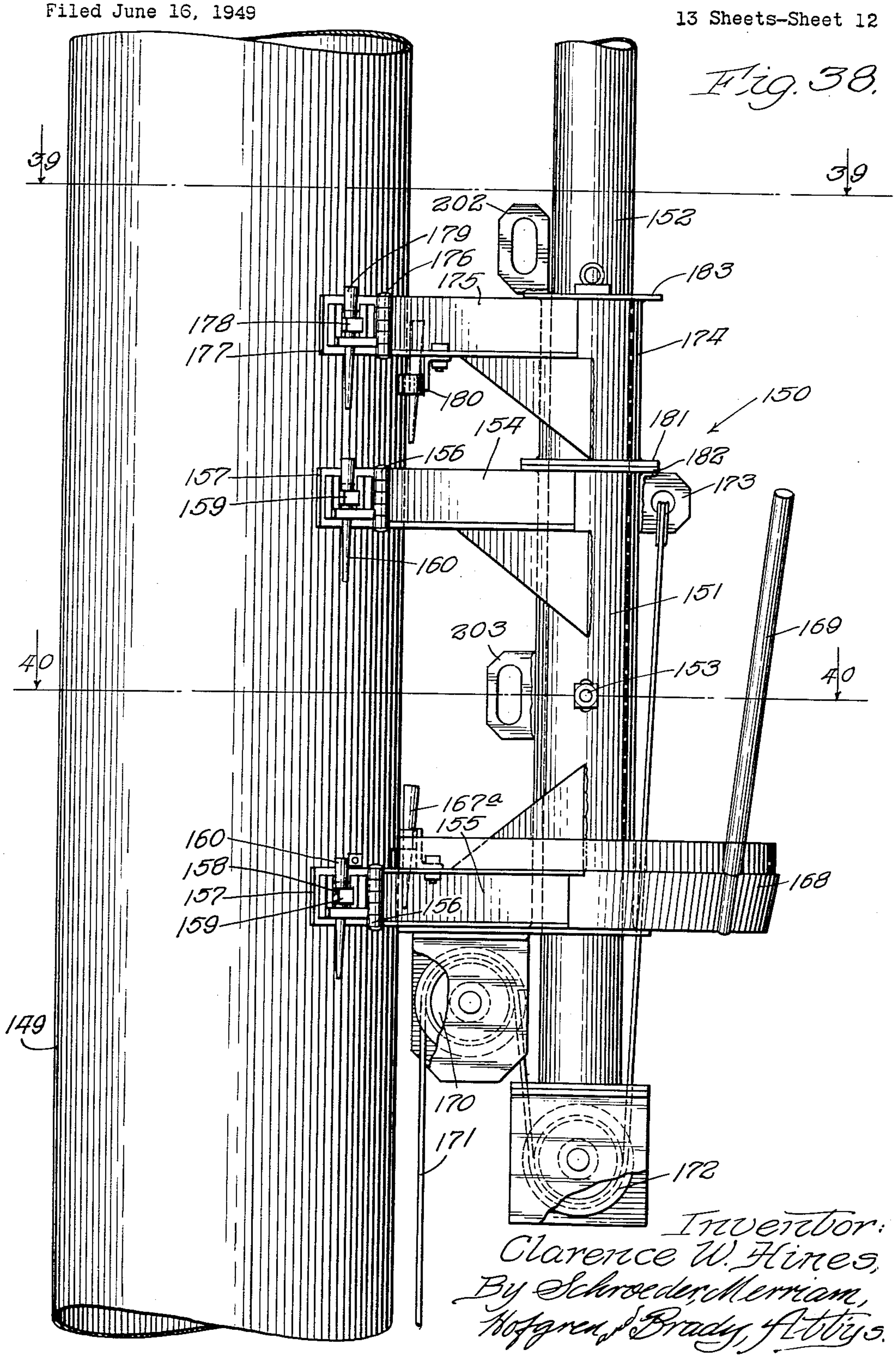
Figure 39:
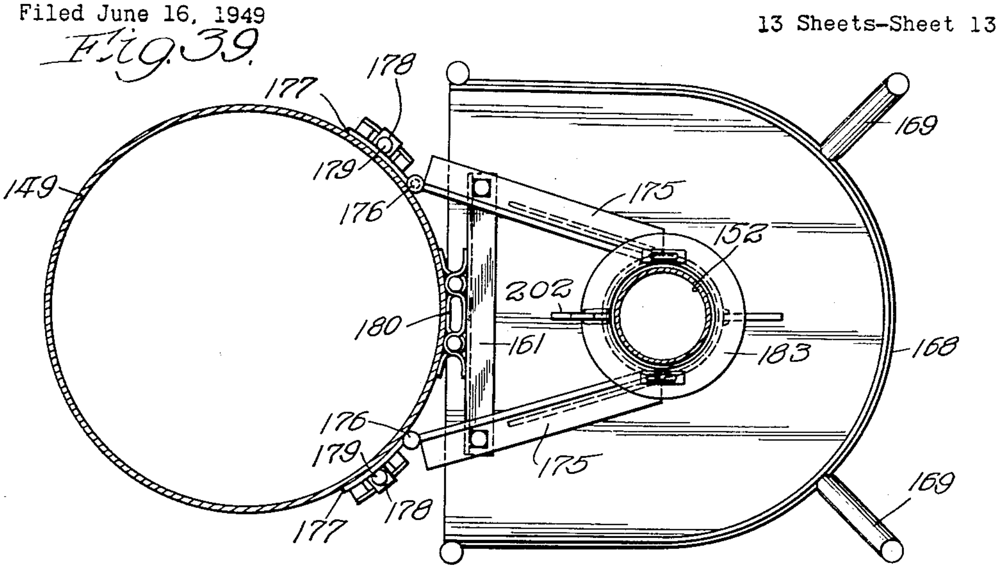
Figure 40:
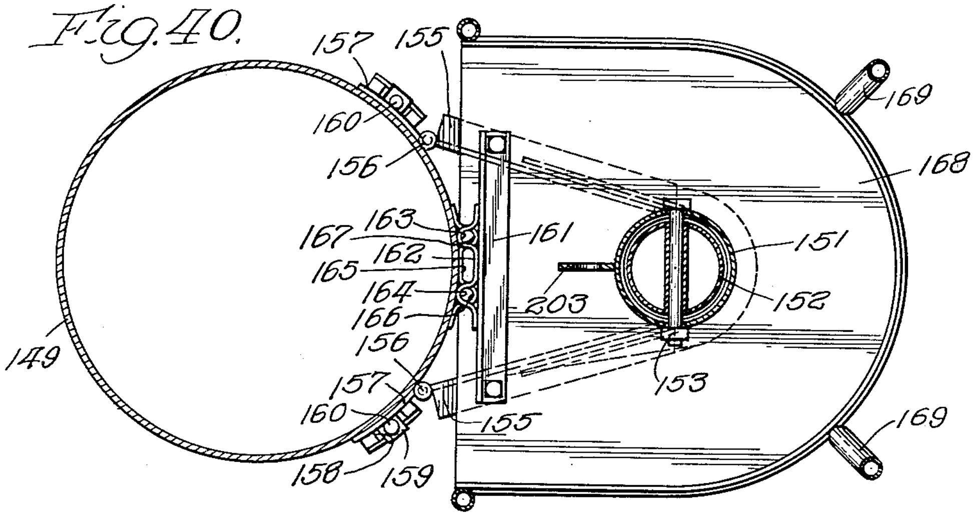
Figure 41:
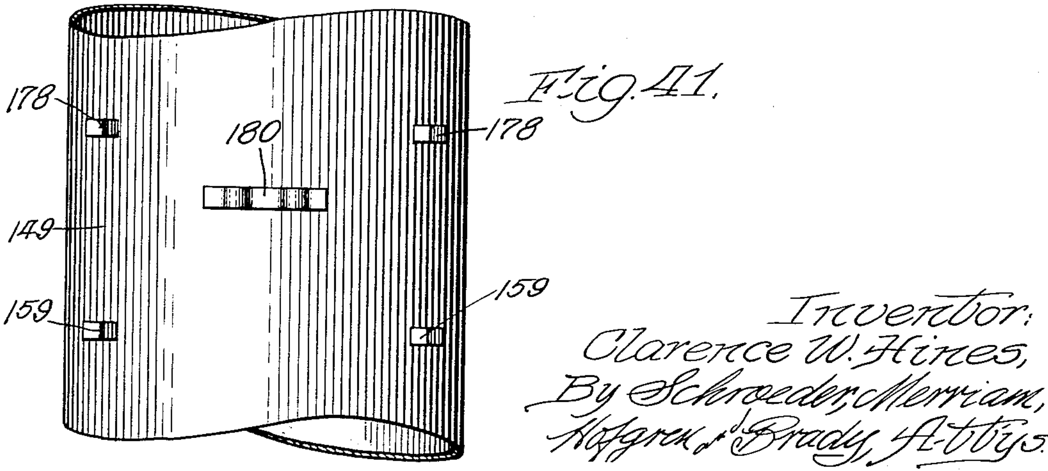

Fig. 23 is a vertical section along line 23—23 of Fig. 22;

Figs. 24 and 25 are vertical and horizontal sections along lines 24—24 and 25—25, respectively, of Fig. 23;

Fig. 26 is an enlarged detail view of a rotatable boom support;

Fig. 27 is a horizontal section, partly broken away, along line 27—27 of Fig. 26;

Fig. 28 is a vertical section along line 28—28 of Fig. 27;

Fig. 29 is a horizontal section along line 29—29 of Fig. 28 showing a portion of the device of Fig. 28;

Figs. 30 to 22 are views showing the steps of erecting a column according to another aspect of the invention;

Figs. 34 and 35 are views showing the continuation of the steps of views 30—33 including the erection of supporting pillars and the tank proper;

Fig. 36 is a view illustrating the manner in which the boom support is removed from the interior of the tank;

Fig. 37 is a horizontal section along line 37—37 of Fig. 36;

Fig. 38 is an enlarged detailed view of the supporting structure for the erecting device shown in Figs. 30–33;

Figs. 39 and 40 are horizontal sections along lines 39—39 and 40—40, respectively, of Fig. 38; and Fig. 41 is a side elevation of a column section showing the means for attaching the supporting device of Fig. 38 thereto.

For the purposes of exemplary disclosure, I have chosen to describe one form of my invention as used in the construction of a watersphere. In constructing such a structure, a foundation 30 for the supporting column is layed, together with a central foundation 31 for the riser. A tubular section 32 is lifted into position upon the foundation 31 by means of a gin pole 33. Secured to the portion 32 is a rotatable support 34 for a boom 35. The upper end of the boom is secured by means of the boom falls 36 to a rotatable masthead 37. Guy lines 38 are secured to the boom support 34 and to the foundation 30. The structure just described constitutes a derrick which may be used to lift a first section 39 of the tubular column into position on the foundation. Succeeding preformed sections 40, 41, 42 and 43 are lifted into position by the derrick and secured to one another and to the section 42. If desired, the lower sections of the supporting column may be hoisted into position by means of a portable derrick secured to a truck, or by other means.

When the lower portion of the column has been completed a jump pole 45 is hoisted into position and secured to the uppermost section 43 of the column. The jump pole is then used to lift a jib derrick 46 into position on the outside of the uppermost section 43 where it is secured thereto and the jib derrick may be used to remove the column 32 from the inside of the supporting column. The jump pole is then lowered within the supporting column to a point where its top end is below the top of the uppermost section and where it will not interfere with the placement of succeeding sections.

The jib derrick 46 is then used to lift the section 44 into position wherein it is secured to the section 43 and the derrick is then employed to lift the jump pole 45 up to the section 44 whereupon the pole is secured to that section. The jump pole is then used to raise the jib derrick upwardly to a point where the derrick may be attached to the section 44. The jump pole is then lowered within the supporting column and the jib derrick is employed to elevate a succeeding section into position.

The steps just described are repeated to erect the entire supporting column including the transition sections 48 and 49 which are secured to the top of the column. The jib derrick 46, being then secured to the section next below the supporting section 48, is used to raise the boom support 34 to a position where it may be bolted or otherwise secured to the top of the section 49. A first portion 50 of the access tube for the tank is then raised and secured to the top of the boom support 34 and the jump pole 45 is elevated and secured to the section 50. By means of the jump pole, the jib derrick is again moved upwardly and secured to the section 50 from which position it may be employed to elevate succeeding sections 51 and 52 of the access tube into position. The jib derrick is then again jumped upwardly and secured to the then uppermost section 52 of the access tube from where it may be used to elevate the final section 53 of the access tube into position.

Figures 14, 15, 16:
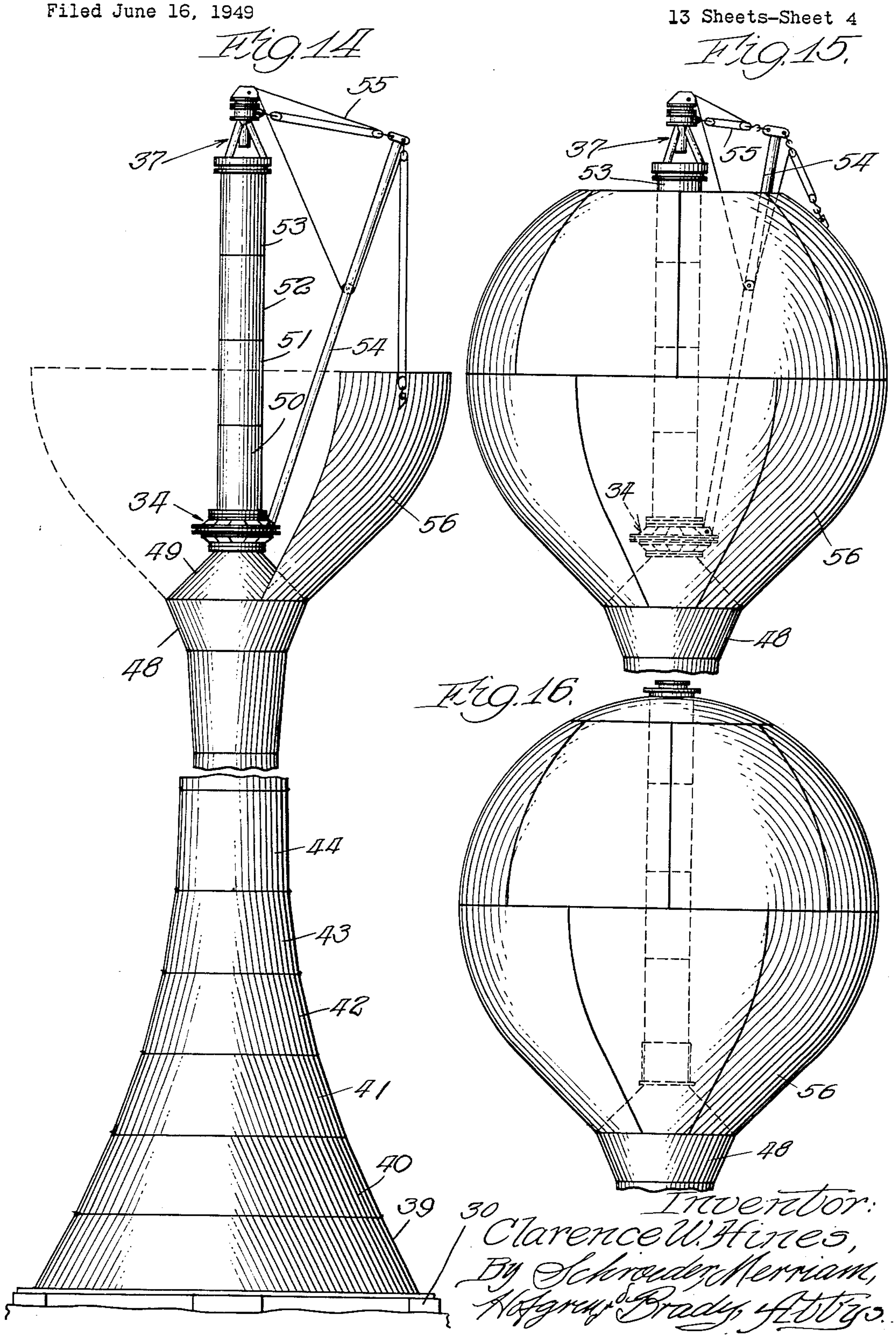

The jib derrick is then used to lower the jump pole to the ground and to raise the masthead 37 into position for attachment to the top of the section 53. A boom 54 is then secured to the boom support and masthead to complete a derrick which may then be used to lower the jib derrick to the ground. The access tube derrick is then employed to raise the first section 56 of the tank proper into position for welding to the transition sections 48 and 49. The other parts to complete the tank are then raised and welded in place as shown in Figs. 15 and 16. The masthead 37 may then be removed from the top of the access tube and lowered to the ground and the boom support, which is constructed in sections hereinafter more fully described, may be removed and replaced by a permanent cylindrical section for the tube.

Figures 1, 2:
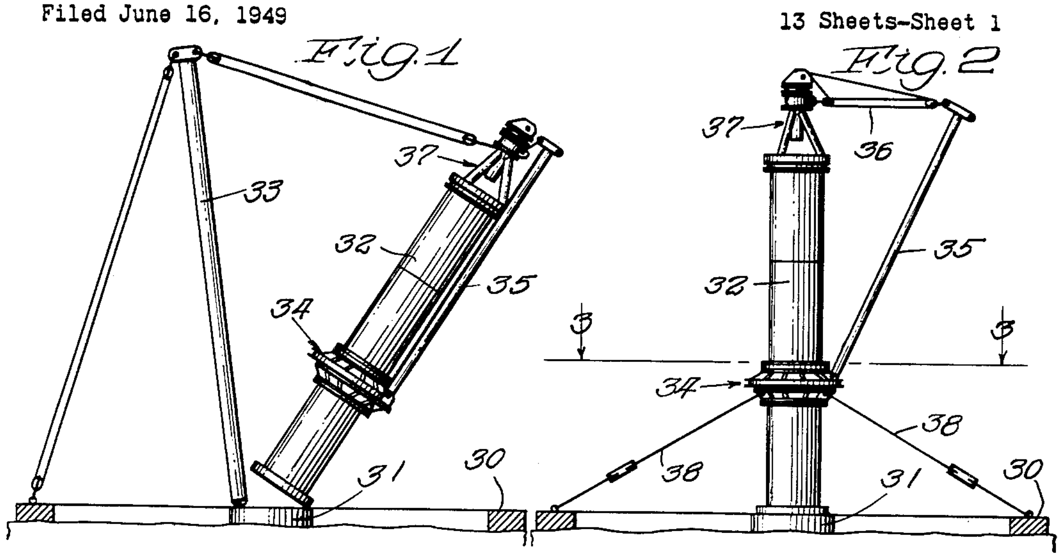
Figs. 1 and 2 are side elevations showing one of the methods for placing a hoisting device on the foundation for the structure.
Figure 4:
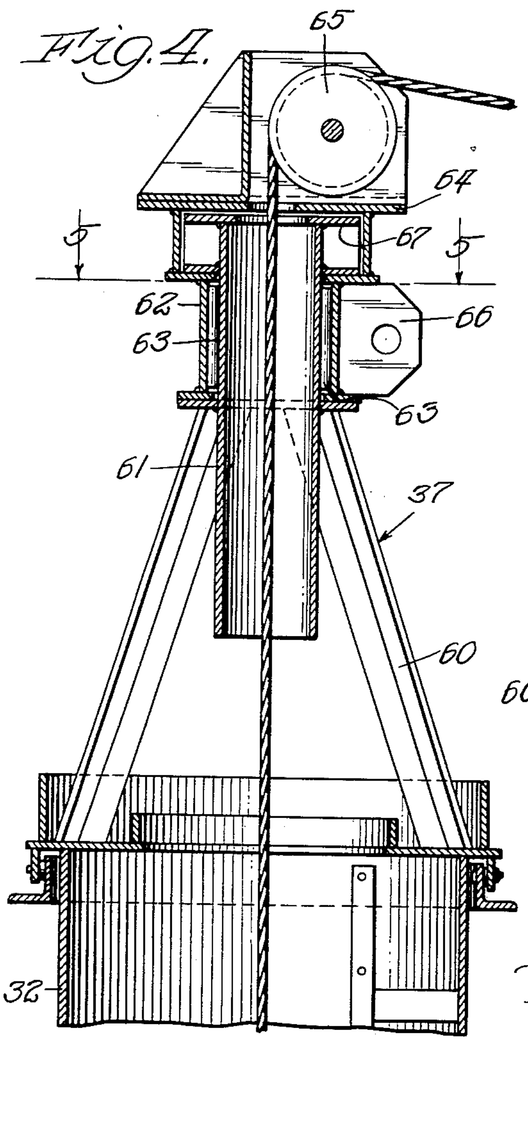
Fig. 4 is a vertical section through the masthead device shown at the top of the column in Fig. 2.
Figures 3, 5:
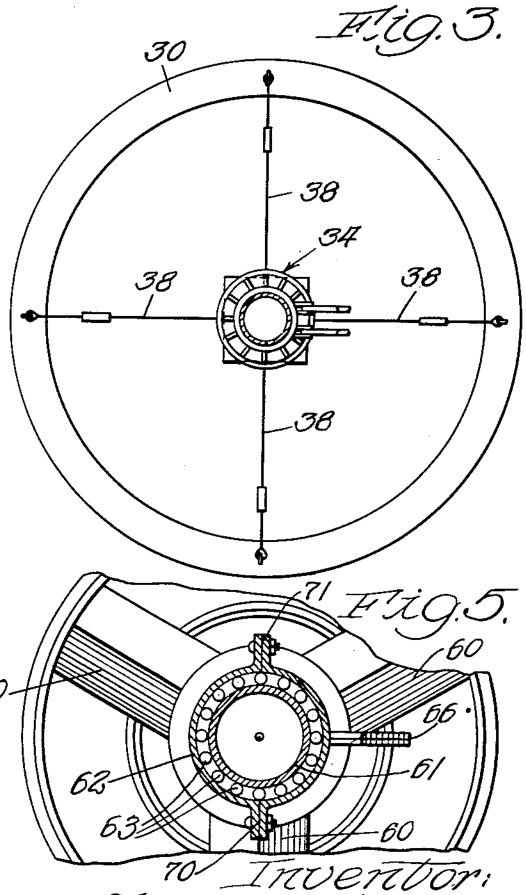
Fig. 3 is a view along line 3—3 of Fig. 2.
Fig. 5 is a horizontal section along line 5—5 of Fig. 4.
Figure 6:
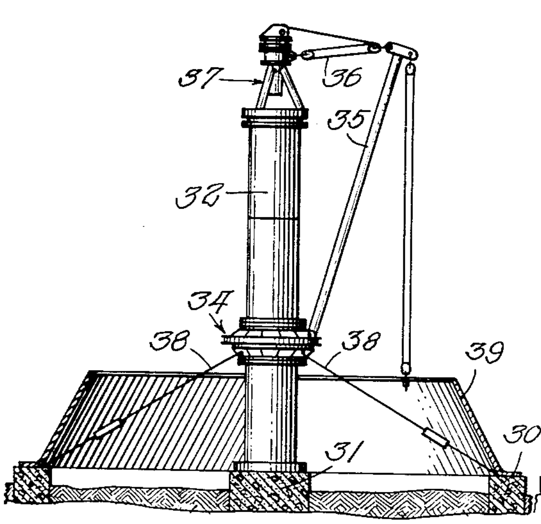
Figure 7:
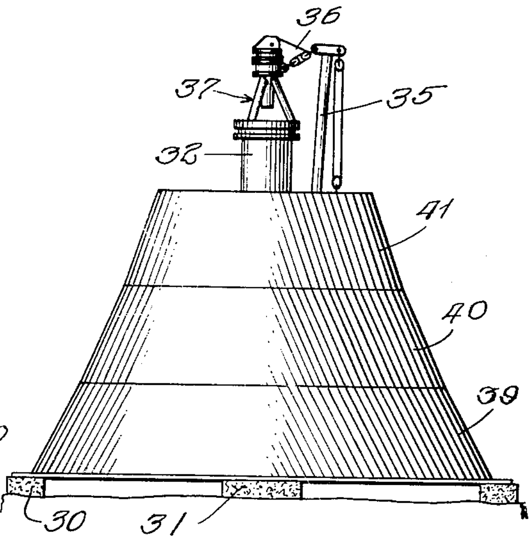
Figure 8:
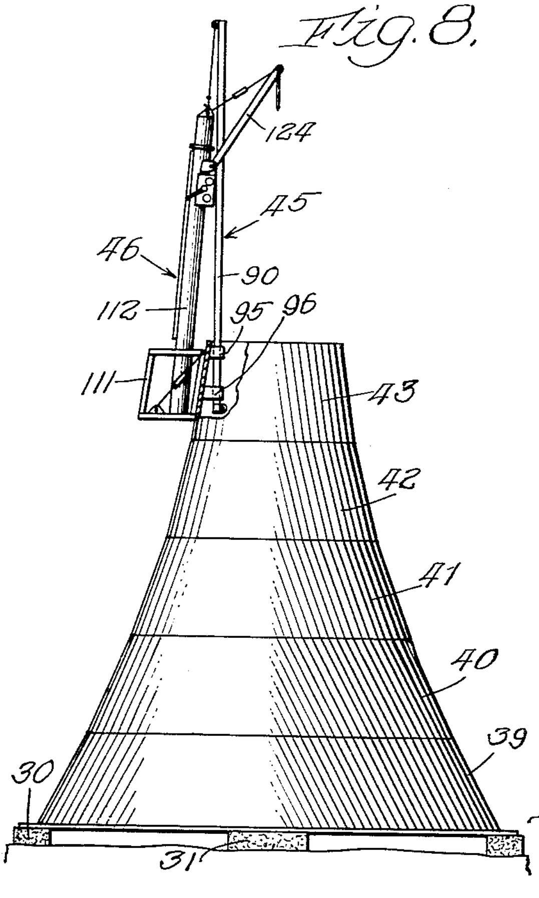
Figure 9:
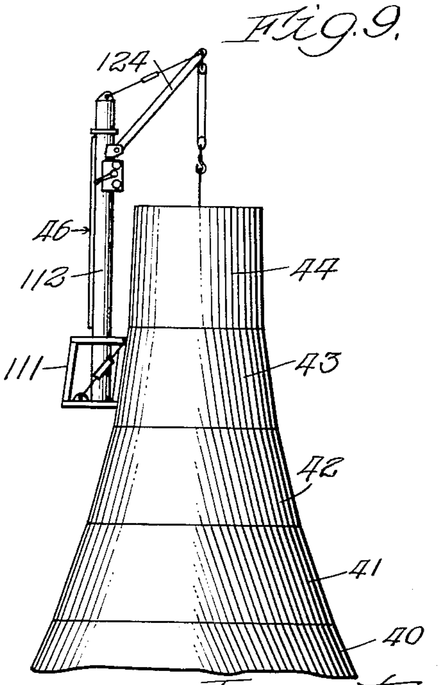
Figures 10, 11, 12, 13:
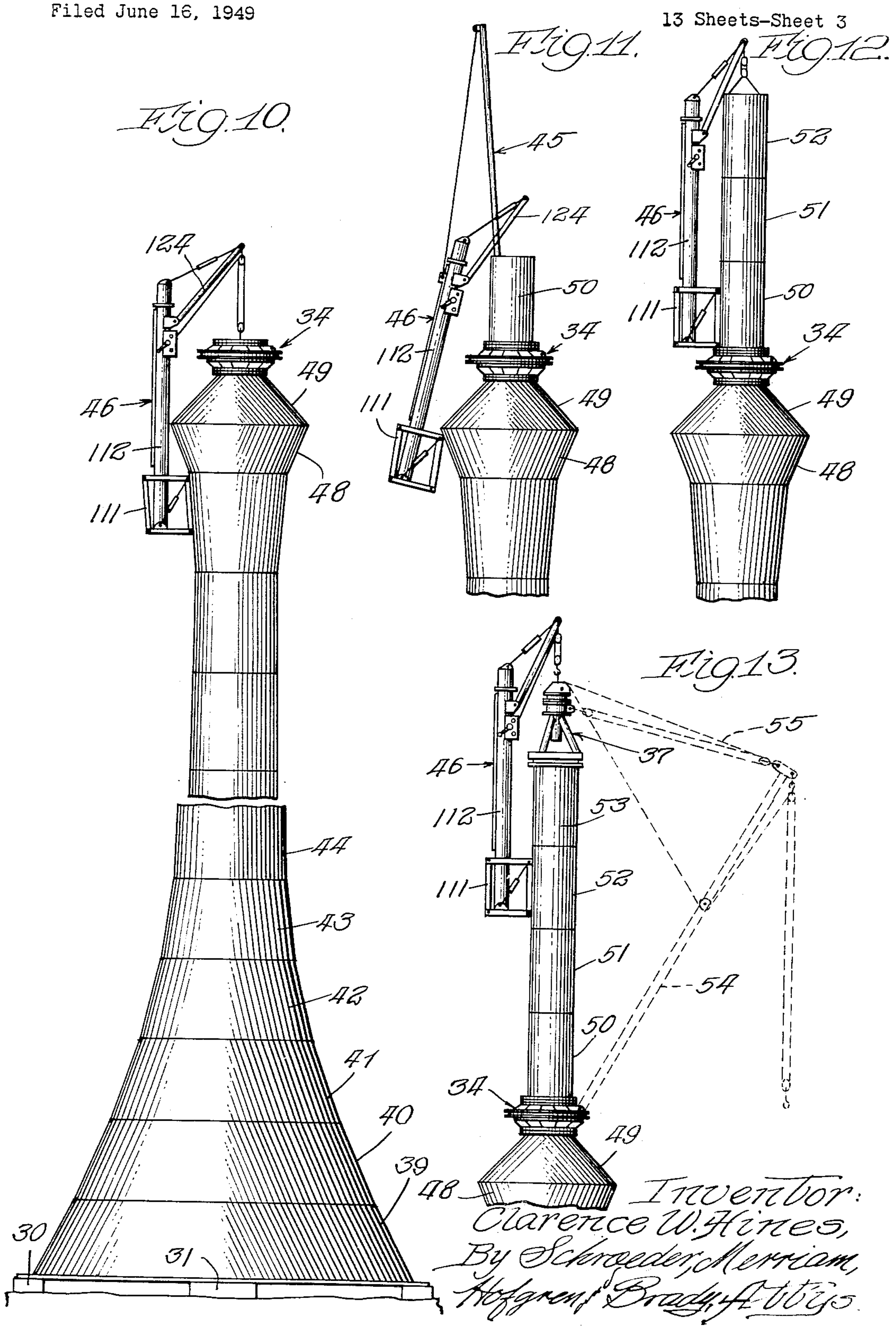

Referring now to Figs. 4 and 5, the masthead 37 comprises a tripod stand 60 adapted to be bolted to the top of a tubular column and carrying at its apex an inner bearing in the form of a cylindrical pipe 61. A ring 62 surrounds the member 61 and is mounted for rotation on roller bearings 63 positioned therebetween. A member 64 is fixed to the ring 62 and carries a lead line sheave 65 and an apertured member 66 into which the boom falls hook. The member 64 is, of course, rotatable with the boom. When the boom is of such a length as to extend upwardly beyond the top of the masthead and is standing nearly vertical there is an upward pull on the member 64. To prevent this member from pulling off the masthead, a head rim 67 is welded to the pipe 61 and extends beyond the ring 62. The ring 62 is constructed in two halves as shown in Fig. 5 which may be bolted together at flanges 70 and 71 to form the ring.

The boom support (Figs. 26–29) includes a main frame 73 which is securely bolted or otherwise fastened to non-rotating sections 49 and 50 of the supporting column. A collar 74 surrounds the frame and carries the boom 54. The collar is mounted for rotation about the frame on horizontal anti-friction bearings 75 and vertical anti-friction bearings 76. The bearings are designed to take the thrust of the boom which will vary from horizontal to vertical depending upon the position of the boom. The collar is in the form of an angle iron having a vertical edge 77 which serves as a bearing race for the vertical rollers and a horizontal leg 78 serving as a bearing race for the horizontal bearings. The collar is reinforced by gusset plates 79 extending between the vertical and horizontal legs and is provided with a channel member 80 to act as a bull wheel for turning the derrick with power. The collar and frame are divided into three sections, 81, 82 and 83, which sections are secured to adjacent sections of each member by means of bolts. After the completion of the access tube, a first section such as the section 83 may be removed and replaced with a corresponding cylindrical section of the access tube. The replacement section is welded to the access tube and to the top of the transition section 49 whereupon a second section such as the section 82 may be removed and replaced with a cylindrical section. The final section 81 may then be removed from position and a final replacement section welded to the access tube and to the reinforcing section to complete the access tube. Thus, it is possible to remove the boom support without the necessity for providing support for the access tube during the removal operations.

If so desired, the rotatable support for the boom may be made up in a single piece. To remove such a boom support, the access tube 50 is supported on the tank proper, as by braces and joists, and the boom support removed as a whole. A replacement section may then be welded to place in the space vacated by the boom support, such a replacement section being preferably in the form of two halves of a cylindrical section. Each half is then welded to the access tube 50, the section 49, and to the other half.

The jump pole device 45 (Figs. 17–19) comprises a mast 90 adapted to be removably secured to the interior of the supporting column. The mast is equipped with the usual pulleys and cables to act as a hoisting device. In securing the jump pole to the inside of the column two pairs of lugs 91 and 92 are welded to the interior of the section to which the jump pole is to be attached, the welding preferably taking place before the section is raised into position. Sleeves 93 and 94 are secured to brackets 95 and 96 by means of bolts 97 and 98. The sleeves 93 and 94 are so proportioned as to permit the mast 90 to slide therein and the lower sleeve 94 is provided with an opening 98 extending therethrough. The brackets 96 are each provided with apertures 99 into which the lugs 91 and 92 may be received and the brackets may thereupon be temporarily attached to the tubular section by dropping pins 100 through holes provided in the lugs. The jump pole is provided with a hole 101 matching the hole 98 in the lower sleeve and the mast may be secured in its elevated position by inserting a pin 102 through the holes in the lower bracket and in the mast. The mast is provided with an apertured member 103 through which a line may be passed for raising the jump pole from its lowered position to the position shown in Fig. 17.

The jib derrick 46 (Figs. 20–25) comprises a member in the form of a channel iron 105 adapted to be removably secured to the outside of a column section. For this purpose, the member 105 is provided with slots 106 at each end adapted to receive lugs 107 welded to the side of the column section, the lugs being apertured to receive pins 108. Attached to the member 105 is a frame in the form of an adjustable parallelogram. The frame has sides 109 and 110 with each side consisting of an upper and lower angle iron. The sides are hingedly attached to the member 105 and to an end section 111, the end section being similarly constructed of angle irons. By so constructing the frame, I provide a support for a mast 112 which may be rocked to provide a vertical mounting for the mast regardless of whether the section of the column to which the jib derrick is attached has vertical sides or has sides which are inclined from the vertical in either direction. Accordingly, a turnbuckle arrangement 113 is attached to diagonally opposite corners of the frame being hingedly attached at its lower end to the side 109 and at its upper end to a triangular metallic member 114. The member 114 is secured to the member 105 and to the side 109 by means of a bolt 115. A similar turnbuckle arrangement 116 connects diagonally opposite corners of the frame on the side opposite that occupied by the turnbuckle 113. To secure the jib derrick against sway or movement, stays 117 and 118 are provided which extend from the top of the sides 109 and 110 to opposite sides of the column where they may be secured thereto by means of the lugs 119 and 120. Similar stays 121 and 122 are provided at the bottom of the sides 109 and 110, the latter stays also extending to opposite sides of the column, at which points they are secured in the same manner as the stays 117 and 118. Attached to the mast 112 is a boom 124 and the usual cable and sheave devices 125. The mast is rotatably held within the frame, there being a plate 126 secured to the top of the sides 109, 110, which plate is provided wtih an opening 127 through which the mast extends. The bottom end of the mast is formed to a convex shape to provide a bearing 128 resting against a plate 129 secured between the lower portion of the sides 109 and 110. Both plates 126 and 129 may be moved inwardly and outwardly with respect to the column and secured to the upper and lower portions of the sides respectively at any desired points. To this end I provide a series of holes 130 along the upper edges of the sides 109 and 110 into which holes bolts 131 on the plate 126 may be inserted and secured. The bottom portions of the sides 109 and 110 are joined by a plate 132 in which there is provided an elongated slot 133 for the purpose of permitting the hoisting cable to pass through regardless of the position of the mast. Holes 134 are adapted to receive bolts 135 to permit bolting the plate 129 at desired points. It can be seen then that with the member 105 attached to a non-vertical section of the column the frame may be rocked by means of the turnbuckle arrangement to a position wherein the sides of the frame are horizontal. When this has been accomplished, the plates 126 and 129 may be moved inwardly or outwardly so as to adjust the mast to a vertical position.

In the erection of water tanks of small capacity, the central column or riser is often of insufficient diameter to permit a man to enter the column to perform certain steps such as attaching and removing the jump pole, attaching the supporting lugs, etc. Accordingly, the procedure and equipment previously described may be modified somewhat in order that all operations take place on the exterior of the central column. These modifications are shown in Figs. 30–41, inclusive.

Referring now to Fig. 38, I show a removable support 150 adapted to be temporarily secured to the central column 149 of an elevated water tank. The support 150 consists of a tubular member 151 through which extends a mast 152. The member 151 is provided with holes matching corresponding holes in the mast 152 through which bolts 153 may be passed to secure the mast to the support. A pair of straps 154 extend outwardly from the member 151 near one end thereof and a similar pair of straps 155 extend outwardly from the other end of the member 151. Secured to the outer ends of each of the straps by means of hinges 156 are apertured plates 157, each of the plates being provided with an opening 158 therein to receive an apertured lug 159 welded to the column 149. Pins 160 may be passed through the holes in the lugs 159 to secure the member 151 to the column. To prevent side sway in the support 150, angle irons 161 are bolted or otherwise secured between each pair of legs 154 and 155 and to each angle iron 161 there is secured a curved steel fastening device 162, the device being so curved as to provide a pair of openings 163 and 164 therein. The intervening portions of the device 162 are welded or otherwise secured to the angle iron 161. The openings 163 and 164 are adapted to register with similar openings formed in a corresponding fastening device 165 welded to the column 149. The device 165 is also curved at 166 and 167 to provide apertures matching the openings 163 and 164 and to receive pins passing through each pair of matched openings.

Secured around the lower portion of the member 151 is a platform 168 provided with a guard 169 which platform is of sufficient size to permit a man to stand thereon and perform the various functions to secure and remove the member 151 to the column 149.

Secured to the side of the member 151 adjacent its lower end is a sheave 170 adapted to receive a cable 171 passing thereover and thence downwardly around another sheave 172 secured to the bottom of the mast 152. The cable then passes upwardly and is secured to a fitting 173 at the upper end of the member 151.

Also a part of the support 150 is a second tubular member 174 adapted to receive the mast 152 therethrough and provided with straps 175 similar to the straps 154, each strap being provided with a hinge 176 at its outer end and secured to an apertured plate 177. The aperture in the plates 177 are adapted to receive apertured lugs 178 therethrough, the lugs being welded to the column 149. A pin 179 may be inserted through the lug 178 to secure the plate and hence the member 174 to the column. A fastening device 180, similar to the fastening device 162—164, is provided on the member 174 to hold that member against side sway. The lower end of the tubular member 174 is provided with a flange 181 adapted to rest against the corresponding flange 182 provided on the upper end of the member 151. The member 174 is also provided with a second flange 183 adjacent its upper end against which a pin or bolt 184 extending through an opening 185 in the mast 152 may rest to secure the mast against vertical movement when supported solely by the member 174 as hereinafter described.

As shown in Fig. 30 a derrick 200 in the form of a boom and a rotatable support therefor is secured to the upper end of the mast 152.

The operation of the device just described is as follows: With the members 151 and 174 secured to the column 149 by the means described, the derrick 200 may be employed to lift a second column section 201 to the position shown in Fig. 30. The derrick may then be rotated on the mast 152 to swing the section 201 into position over the section 149 in which position it may be secured thereto. The cable of the derrick is then secured to a fitting 202 attached to the member 174 and the fastening devices which secure that member to the column 149 are removed. The member 174 is then lifted upwardly by means of the derrick to the position shown in Fig. 31 where it is secured to the upper portion of the column 201 by means of pins through apertured lugs then provided on the upper part of the column 201. The mast may be then secured to the member 174 by means of the pin and aperture device 184—185 previously described. The cable on the derrick is then released from the fitting 202 and secured to a fitting 203 attached to the member 151. Bolt 153 is then withdrawn and the various pins which secure the member 151 to the column 149 are removed and the derrick employed to lift the member 151 to the position shown in Fig. 32 wherein it may be secured to the top of the column 201. By removing the pin 184 which secures the mast to the member 174 and by pulling on the cable 171, the mast is then slid upwardly through the members 151 and 174 until it reaches the position relative thereto which it had previously occupied and which is illustrated in Fig. 30 whereupon the bolt 153 and the pin 184 may be reinserted and the mast and derrick are then ready for use to hoist another column section into position. Succeeding column sections may be elevated in position by moving the supports, mast and derrick upwardly as just described.

When the final column section 204 is secured in position and the support 150 moved to the top thereof as shown in Fig. 33, a rotatable support 205 for a boom may be hoisted into position and secured to the top of the column 204. The support 205 is similar to the support 34 hereinbefore described. A tubular section 206 is then hoisted into position and secured to the support 205. The section 206 is provided with a rotatable tripod 207 similar to the member 37 hereinbefore described. A boom 208 and boom falls 209 are then secured to the members 205 and 207 to provide a derrick 210 at the top of the column. The derrick 210 is then employed to lower the mast 152, its derrick 200, and the supports 151 and 174 to the ground.

As shown in Fig. 34, the derrick 210 is then employed to hoist the peripheral supporting columns 211 into final position. The columns 211 are secured to the central column 212 of the tank by means of ties 213. I prefer to secure the ties 213 to the supporting columns 211 by means of hinge pins 216 and 217. This operation may be completed before the column 211 is hoisted to the position shown in Fig. 34 and the ties may be swung outwardly to a horizontal position and secured to the column 212 while the column 211 is still held in position by the derrick 210.

During this operation and during the subsequent operation of lifting the plates forming the tank proper, the column 212 is secured against side sway by guys 214 which extend downwardly from the top of the column 212 to the foundation 215 for the supporting columns.

As shown in Fig. 35, the derrick 210 is then used to hoist the various preformed plates which form the tank proper into final position wherein they are welded to each other and to the various supporting columns 211. In order to remove the derrick 210 I omit one of the plates forming the bottom of the final tank 220 to leave an opening 221 therein through which the derrick 210 may be lowered by means of the detached boom 208. The boom 208 is then removed, the missing bottom plate welded into position and the final plate forming the top of the tank is then secured in place to complete the structure.

It will be noted that in either embodiment of my invention no guys were used for the derrick which extend beyond the foundation of the completed tank. Thus, by employing my invention it is possible to erect a tank in any location where there is room for the tank alone.

While I have shown and described certain embodiments of my invention it is to be understood that it is capable of many modifications. Changes, therefore, in the method, construction and arrangement may be made without departing from the spirit and scope of the invention as disclosed in the appended claims.

I claim:

1. The method for erecting a hollow supporting column which comprises the steps of preparing a foundation for the column, placing a lower section of the column into final position on the foundation, securing a hoisting device only to the lower section so as to extend above the lower section, elevating a second section of the column with the hoisting device, securing the second section in final position on the lower section, raising a supporting portion of the hoisting device and securing it to the second section of the column, then raising a second supporting portion of the hoisting device and securing the second supporting portion to the second section of the column, then raising a third portion of the hoisting device so as to extend upwardly above the second part of the column all without use of a separate hoisting device and repeating the steps to complete the column.

2. The method for erecting a hollow supporting column which comprises the steps of preparing a foundation for the column, placing a lower column section in final position on the foundation, securing a pair of supports to the outside of the lower column section and mounting a hoisting boom in the supports so as to extend upwardly above the section, then using the boom for raising a second column section into final position on the first, sequentially supporting the boom on one support while raising the other boom support and attaching it to the second column section, and then raising the boom to extend above the second column section, and repeating the steps of raising additional column sections and raising and securing the supports and boom to the added sections to complete the column.

3. The method of erecting a hollow supporting column for an elevated structure, comprising the steps of preparing a foundation for the column, placing a lower column section in final position on the foundation, securing a hoisting device including a pair of supports and a boom to the lower column section so that the boom extends substantially upwardly above the section, rigging the hoisting device with cables operable from the ground, then raising sequentially additional column sections and the hoisting device by means of the cables to progressively erect the column and raise the hoisting device to the top of the column.

4. The method of erecting an elevated storage tank structure having a hollow metal supporting column which comprises preparing a foundation for a central column, placing a lower column section in final position on the foundation, securing a hoisting device to the lower column section only so as to extend above the section, rigging the hoisting device with cables, raising a second column section into final position on the lower section with the hoisting device, raising the hoisting device by means of the cables to extend above the second column section by alternately raising supporting portions thereof and securing them in position on the second column section to support the hoisting device thereon, repeating the above steps to complete the central column, and then erecting the balance of the tank structure by the hoisting device positioned at the top of the central column.

5. The mehod of erecting a hollow supporting column for an elevated structure which comprises, preparing a foundation for the column, providing the column in sections thereof to be erected one above the other, mounting the lower section on the foundation in final position, securing a hoisting device to the lower section by means of supports secured only to the section, and then alternately raising additional column sections into final position with the hoisting device and raising the hoisting devce and its supports so that the device is supported on the uppermost positioned column section to completion of the column.

6. The method for erecting a hollow supporting column which comprises preparing a foundation for the column, placing the lower part of the column into final position on the foundation, securing a hoisting mast having a pair of supports only to said part, elevating a second part of the column into position with the hoisting device, sequentially lifting the mast supports by means of the hoisting mast and sequentially securing the supports only to said second part, lifting the mast of the hoisting device by means of its supports and securing the mast in its supports so as to extend above the lower part of the column, elevating a third part of the column into position with the hoisting device and repeating the process to complete the column.

References Cited in the file of this patent

UNITED STATES PATENTS

| | | |
|---|---|---|
| 1,539,546 | Deenik | May 26, 1925 |
| 1,872,810 | Raymond | Aug. 23, 1932 |
| 1,947,515 | Blackburn | Feb. 20, 1934 |
| 2,221,133 | Gladville | Nov. 12, 1940 |
| 2,304,354 | Harvey | Dec. 8, 1942 |

| | | |
|---|---|---|
| 2,352,879 | Alexander | July 4, 1944 |
| 2,355,874 | Laird | Aug. 15, 1944 |
| 2,432,528 | Lively | Dec. 16, 1947 |
| 2,493,695 | Payne | Jan. 3, 1950 |

FOREIGN PATENTS

| | | |
|---|---|---|
| 322,099 | France | Nov. 28, 1929 |

OTHER REFERENCES

Pages 110–112, Construction Methods, January 1947.